Jan. 3, 1961    L. B. D'AVIGDOR    2,967,062
SWAY AND PITCH CONTROL APPARATUS FOR VEHICLES
Filed Aug. 30, 1956    2 Sheets-Sheet 1
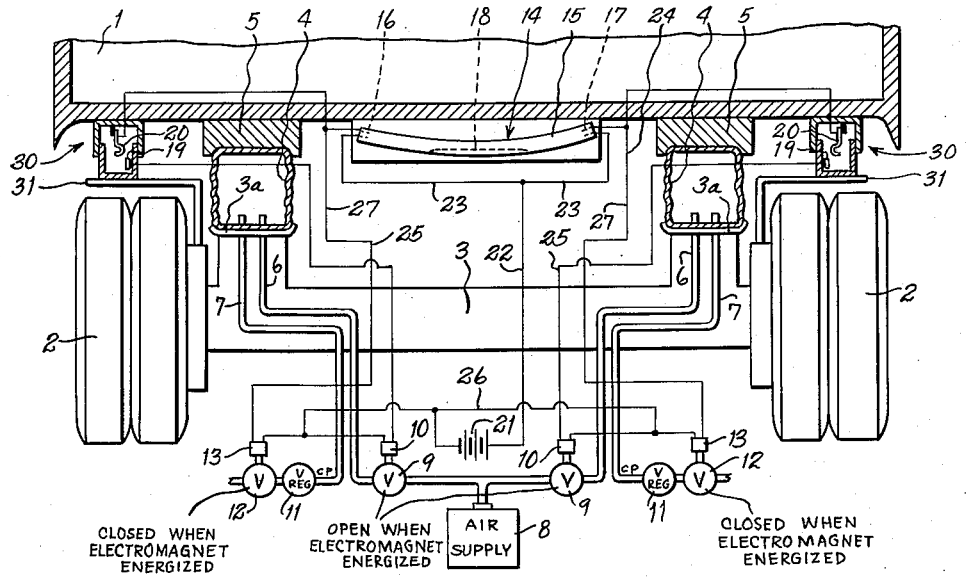
INVENTOR.
Leslie B. d'Avigdor
BY
ATTORNEY Jan. 3, 1961     L. B. D'AVIGDOR     2,967,062
SWAY AND PITCH CONTROL APPARATUS FOR VEHICLES
Filed Aug. 30, 1956     2 Sheets-Sheet 2
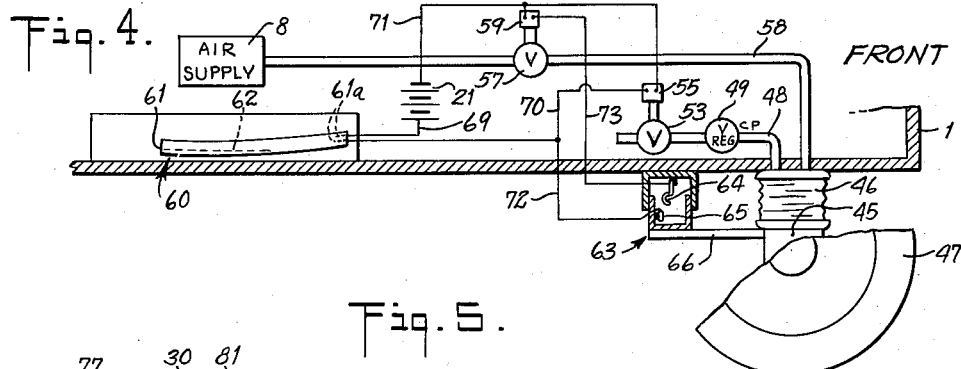
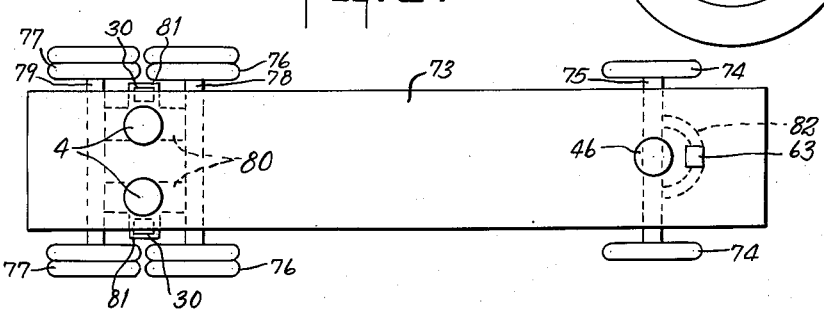
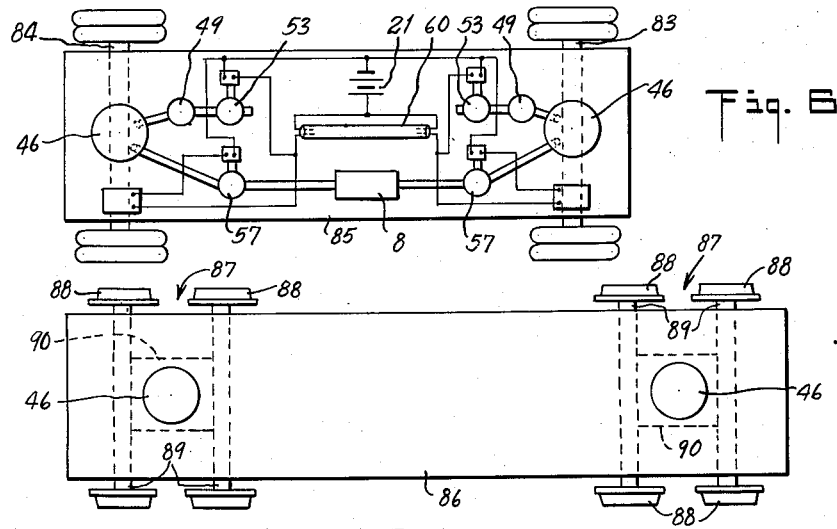
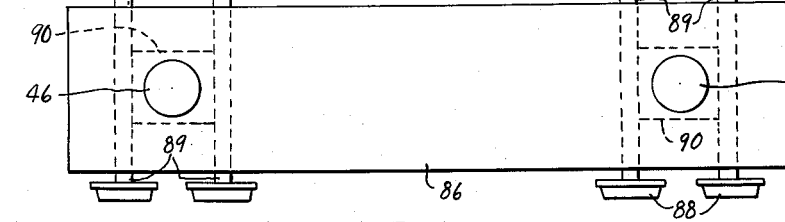
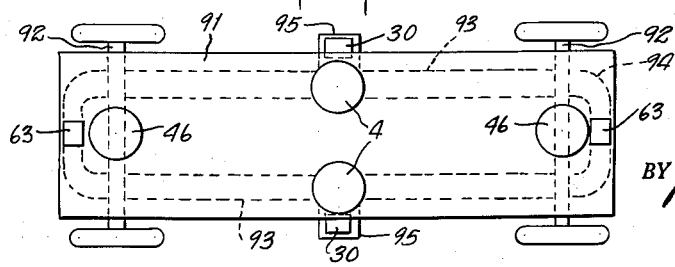
INVENTOR.
Leslie B. d'Avigdor
BY
ATTORNEY “United States Patent Office”

2,967,062
Patented Jan. 3, 1961

2,967,062

SWAY AND PITCH CONTROL APPARATUS FOR VEHICLES

Leslie B. D'Avigdor, 63 Wall St., New York, N.Y.

Filed Aug. 30, 1956, Ser. No. 607,021

7 Claims. (Cl. 280—112)

This application is a continuation-in-part of my prior application, Serial No. 514,584, filed June 10, 1955, now Patent No. 2,934,353, dated April 26, 1960, entitled "Sway Control Apparatus for Vehicles."

This invention relates to sway and pitch control apparatus for vehicles. It is concerned with improved apparatus for maintaining the body of a vehicle level against any tendency to sway or pitch. The term "sway" is used herein to denote a tilting or leaning to one side or the other. The term "pitch" is used, on the other hand, to denote a forward or backward tilting or leaning. Swaying may arise from any of several different causes, including, for example, uneven loading of the vehicle, travelling on a road with a high crown or other tilted surface, or travelling around a curve at high speed. Pitching is caused by travelling up or down grade or by acceleration or deceleration. In modern highway vehicles, pitching due to rapid deceleration presents the most difficult problem. The swaying and pitching of the body of the vehicle with which the present invention is concerned are to be distinguished from transient upward and downward motions due to roughness of the road or other supporting surface. Rapid upward and downward movements such as those due to roughness are best taken care of by the conventional spring and shock absorbing systems. The present invention is concerned with tilting and swaying movements of longer duration, rather than with short duration movements due to rough roads, and is intended mainly to supplement existing suspensions, whether of the steel spring or air spring variety.

An object of the present invention is to provide improved sway control apparatus for vehicles.

Another object is to provide improved pitch control apparatus for vehicles.

Another object is to provide improved apparatus for controlling both the swaying and pitching of vehicles.

A further object is to provide apparatus of the type described which distinguishes between motion of the vehicle body due to roughness of the road and swaying or pitching movements of longer duration.

Another object is to provide improved apparatus for correcting the level of a vehicle body.

Another object is to provide improved control apparatus for a body level correcting apparatus of the type described.

The foregoing objects are attained in the apparatus described herein. The sway control apparatus disclosed includes, for each side of the vehicle, between the axle or axles and the body, one or more force applying mechanisms including an expansible pneumatic chamber and means for supplying air to and discharging it from the chamber to regulate the volume of the chamber. This air supply and discharge means is controlled by means of electrically operated valves in response to electrical control devices.

One type of electrical control device used in the apparatus responds to gravity and to acceleration forces. A preferred form of this type of control device includes a tube in the shape of a wide shallow U, a pool of mercury within the tube and two sets of contacts at the opposite ends of the tube to be engaged by the mercury. For sway control purposes one or more devices of this type are mounted crosswise of the vehicle.

Another type of electrical control device used in the apparatus responds to the spacing between an axle and the body of the vehicle. Typically, this device is a switch which closes when that spacing becomes less than a certain predetermined value. The interaction of these two types of control devices is described in detail below.

The pitch control apparatus disclosed may include either one force applying mechanism of the type described, located at the front of the vehicle, or two or more such mechanisms, located at opposite ends of the vehicle. The electrical control devices of the pitch control apparatus are similar to those of the sway control apparatus, except that the gravity and acceleration responsive device is mounted lengthwise of the vehicle rather than crosswise.

Other objects and advantages of the invention will become apparent from a consideration of the following description and claims, taken together with the accompanying drawings.

In the drawings:

Fig. 1 is a transverse cross-sectional view, somewhat diagrammatic, showing a vehicle provided with a preferred form of sway control apparatus constructed in accordance with the invention;

Figs. 2 and 3 are somewhat diagrammatic views illustrating modified control devices usable in the apparatus of Fig. 1;

Fig. 4 is a fragmentary longitudinal cross-sectional view, somewhat diagrammatic, showing a vehicle provided with a preferred form of pitch control apparatus constructed in accordance with the invention;

Fig. 5 is a plan view, showing a combined pitch and sway control for a vehicle;

Figs. 6 and 7 are somewhat diagrammatic plan views illustrating pitch control apparatus for different types of vehicles; and Fig. 8 is a somewhat diagrammatic plan view illustrating a modified form of combined pitch and sway control apparatus.

*Fig. 1*

This figure illustrates a sway control apparatus for one end or axle of a vehicle. The vehicle is shown as a typical highway vehicle, such as a truck, trailer or bus. Where such a vehicle is provided with a sway control on one axle only, it is preferably placed on the rear axle, since that axle usually is loaded more heavily than the front one. However, it is entirely feasible to provide sway control apparatus for each axle. There is shown a vehicle having a body 1 and two sets of dual wheels 2, the sets of wheels being mounted at opposite ends of a rear axle 3. On the top of the axle housing, at either side of the vehicle, there is provided a mounting pad 3a on which is supported an upward force applying means shown as an expansible pneumatic chamber or bellows generally indicated at 4.

The particular form of the chamber 4 is not material to the present invention. Many types of expansible pneumatic chambers are commercially available which will answer the purpose. The chamber must be able to expand and contract in a more or less vertical direction in response to changes in the pressure inside it. The chamber is illustrated as a bellows having a convoluted side wall. Such a structure is presently preferred, but other equivalent structures may be used.

Frame members 5 supporting the body 1 rest on the tops of the chambers 4. It should be understood that the body 1 and the frame 5 may be supported by conventional springs and shock absorber arrangements, in addition to the tilting control apparatus illustrated herein. The interior of each of the chambers 4 is in communication with an inlet conduit 6 and an outlet conduit 7. Each inlet conduit 6 leads to a supply of air under pressure schematically indicated at 8. The flow of compressed air through each inlet pipe 6 is controlled by a valve 9 operated by an electromagnet 10. The valve 9 is normally closed and is opened when the electromagnet is energized.

The outlet conduit 7 is connected through a pressure regulating valve 11 and a shut-off valve 12 to an outlet open to the atmosphere. The shut-off valve 12 is normally open, and may be closed by energization of an associated electromagnet 13.

The electromagnets 10 and 13 are controlled in part by an inertia operated electrical control device responsive to gravity and/or to centrifugal force and generally indicated at 14. This device is an electric switch comprising an elongated tube 15 of glass or other electrical insulating material. The tube 15 is of a broad U-shaped configuration and is mounted so that its long dimension extends transversely to the vehicle. Two pairs of electrodes or contacts 16 and 17 extend into the opposite ends of the tube 15. The tube contains a pool of mercury 18 or other electrically conducting liquid.

Two correction limiting or inhibiting controls 30 are provided, one on each side of the vehicle, and each cooperates in the control of the electromagnet 10 on its side. Each control 30 comprises a switch finger 19 insulatingly mounted on a bracket 31 supported on the housing of axle 3, and a cooperating switch finger 20 insulatingly mounted on the body 1. One of the fingers 19 or 20 may be made vertically adjustable by any suitable conventional mechanism for that purpose. The spacing of the fingers is adjusted so that when the vehicle is loaded normally, the conventional spring suspension system is compressed so that the fingers 19 are slightly spaced from their cooperating fingers 20. By placing the correction limiting controls at the extreme sides of the vehicle, where the tilting movements of the body are amplified as much as possible, the adjustment of these contacts is made less critical.

It will be understood that in the arrangement shown in Fig. 1, the sway control apparatus is duplicated on the opposite sides of the vehicle except for the switch 14 and the air supply 8, which serve the apparatus on both sides of the vehicle. It may be that, in some vehicles, sway control apparatus is required on only one side of the vehicle.

*Operation of Fig. 1*

When the body 1 is level, the switch 14 remains in the position illustrated in Fig. 1, with the mercury pool 18 in the center and neither set of contacts 16 and 17 closed. The inlet valves 9 are closed, the outlet shut-off valves 12 are open, and the pressure within the chambers 4 is that established by the pressure regulating valves 11.

Now assume that for some reason, for example because of travelling over a tilted surface, such as a highly crowned road, the switch 14 becomes tilted so that the mercury pool 18 moves to the right and electrically connects the contacts 17. This completes a circuit which may be traced from the positive terminal of battery 21 through wires 22 and 23, switch contacts 17 and thence to wire 24. The circuit there divides, one branch proceeding through switch fingers 20 and 19, wire 25, electromagnet 10 and wire 26 to the opposite terminal of battery 21. The other branch proceeds from wire 24 through wire 27, electromagnet 13 and wire 26 to the opposite terminal of battery 21.

Inlet valve 9 is opened by energization of electromagnet 10 and shut-off valve 12 is closed by energization of electromagnet 13. Note that the energization of the shut-off valve electromagnet is controlled only by the inertia responsive control switch 14, while the energization of the inlet valve electromagnet 10 is controlled by both the control switch 14 and the correction limiting control 30 in series. It is preferable to adjust the relative sensitivity of the two controls so that the switch 14 closes its contacts first in response to increasing tilt or centrifugal acceleration of the vehicle, and the correction limiting control 30 closes its contacts at a slightly greater tilt or acceleration.

The closure of the shut-off valve 12 renders the pressure regulating valve 11 ineffective to release air from chamber 4, so that the increasing tilt of the vehicle compresses the air in the chamber 4, thereby effectively stiffening the spring action of the bellows, and applying to the body 1 a force tending to oppose the tilting of the vehicle. In many cases the closure of the valve 12 is alone sufficient to limit the tilt. If the tilt continues until the control 30 closes its contacts, then the inlet valve 9 opens, supplying air under pressure to the bellows 4, raising the pressure therein, and increasing the upward force applied to the vehicle body. The supply of air to bellows 4 continues until the body is lifted sufficiently to open the contacts of the correction limiting control 30. The outlet valve 12 remains closed until the tilting which originated the operation of the controls is reduced sufficiently to open the switch 14. By holding the outlet valve closed after the correction limiting control opens its contacts, it is ensured that the pressure built up in bellows 4 will be retained at a value high enough to hold the vehicle body nearly parallel with the axle, even though the tilting force continues. This prevents a "hunting" or oscillation of the system which might be established if the outlet valve were not held closed until the correction originating condition is reduced.

Note that the correction limiting control contacts 19 and 20 are open when the body is parallel to the axle, that they close only after the body has departed slightly from that parallel position, and that they open again as the body approaches the parallel position.

It will readily be understood that a tilting movement of the body to the left results in a similar expansion of the chamber 4 at the left-hand side of the vehicle.

When the vehicle goes around a curve, for example a curve to the left, the centrifugal force, acting on the pool 18 tends to move it to the right along the tube 15. Since the body of the vehicle tends to tilt to the right on a curve to the left, as a result of the centrifugal force, it may be seen that during such a time, two effects are acting cumulatively on the switch 14. One effect is due to the actual tilting of the body, and the other is due to the centrifugal force acting on the mercury itself. If the acceleration of the vehicle toward the left is sufficiently great, the mercury pool contacts the electrodes 17, again causing closure of valve 12 on the right-hand side of the vehicle. If the acceleration of the vehicle continues after valve 12 is closed, then control 30 closes its contacts, whereupon air under pressure is admitted to the chamber 4 and continues to be admitted until the correction limiting control 30 opens its contacts. When the control 30 opens its contacts, the inlet valve is closed, and the upward force applied to the vehicle body by the chamber 4 is stabilized at the value then existing. If therefore results that the body of the vehicle is braced against substantial deviation from the horizontal, thereby greatly increasing the comfort of the passengers and/or the safety of the cargo.

An important feature of the present invention is the time delay which occurs during the closing of the switch between a movement of the vehicle body and a closure of the circuit through one of the sets of electrodes 16 and 17 and the substantially instantaneous opening of the circuit during the opening phase of the switch following a movement of the vehicle body. This time delayed closing and substantially instantaneous opening provision is attained in the structure illustrated by making the tube 25 of substantial length as compared to its internal cross-section so that a substantial time is required for the mercury pool 18 to move from its normal position at the center of the tube corresponding to a level position of the vehicle body and zero acceleration of the body in a particular direction through the tube to contact either one of the sets of electrodes 16 or 17 and thus close the switch. During the opening cycle of the switch, however, when the mercury pool is moving from its contact position with either of the terminals to its normal position, no intermediate position of the tube need be traversed to effect the opening of the circuit, and thus such opening is substantially instantaneous. Alternatively, the tube 15 may be made shorter and given a greater curvature, to the same effect. Another alternative structure for producing a time delay is shown in Fig. 2, where the inner surface of a mercury-containing tube 32 is roughened or pebbled to delay the flow of mercury through it. This arrangement is particularly effective in slowing the movement of the mercury in response to centrifugal or acceleration forces. In some cases, a simple restriction of the interior of the tube may provide an adequate time delay. This time may be, for example, of the order of a major fraction of a second, but is nevertheless long enough so that rapid movements of the mercury due to rough roads and the like are not effective to move the mercury far enough to complete an operating circuit for the tilt control apparatus.

While the mercury switch illustrated in Fig. 2 is presently preferred as being a desirable form of control device including a suitable time delay, other types of control devices may be used without departure from the invention. For example, the gravity and/or centrifugal force responsive body may be some other liquid or a powdered metal.

There is shown in Fig. 3 a modified form of inertia responsive control means which is broadly equivalent to the mercury switches 14 and 32. This control means includes a pendulum weight 33 carried at the bottom of an arm 34 which supports a pair of electrical contacts 35 and 36. These contacts cooperate with respective stationary contacts 37 and 38. The pendulum 33 is connected through a link 39 with a piston rod 40 attached to a piston 41 which moves in a cylinder 42. A restricted opening 41a is provided between the opposite ends of a piston so that the structure serves as a dash-pot to retard the motion of the pendulum 33. It may be seen that the device shown in Fig. 3 operates to close one or the other of its sets of contacts after being subjected to an acceleration to the left or right for a time determined by the characteristics of the dash-pot mechanism.

*Fig. 4*

This figure illustrates one form of pitch control apparatus constructed in accordance with the invention. The form of apparatus shown is presently preferred for highway vehicles, and operates at the front end only of the vehicle. The principal cause of undesirable pitching in such vehicles is rapid deceleration. Accelerations take place at rates under better control of the operator, and do not ordinarily cause excessive pitching. The apparatus at the front of the vehicle takes care of the deceleration-caused pitching, which is characterized by a downward movement of the front end of the body. With other types of vehicles, e.g., double-ended vehicles such as railway vehicles, pitch control mechanisms at both ends of the vehicle are necessary. The vehicle illustrated in Fig. 4 may be the same as that shown in Fig. 1, an axle 45 appearing in Fig. 2 being the front axle. Parts in Fig. 4 which have the same structure and function as their counterparts in Fig. 1 have been given the same reference numerals. A supporting wheel 47 is mounted on the axle 45. Between the axle 45 and the body 1 is located a force applying mechanism 46, shown as a bellows, which may be of any suitable conventional construction, being preferably made with heavy rubber convoluted walls. The control mechanism for the bellows 46 will now be completely described.

The interior of the chamber defined by the bellows 46 is connected through a conduit 48, a constant pressure regulating valve 49, and an outlet valve 53 to the atmosphere. The valve 53 is normally open and is provided with an electromagnet 55 which closes the valve when it is energized. The regulating valve 49 is effective to maintain a constant pressure at its inlet except when its outlet is blocked by the closure of the valve 53. Air under pressure may be supplied to the interior of the bellows 46 from the source of compressed air 8, through an inlet valve 57 and a conduit 58. The inlet valve 57 is normally closed and is opened by energization of an electromagnet 59.

The outlet valve electromagnet 55 is controlled by an inertia operated time delay control generally indicated at 60. This control is illustrated as a mercury switch comprising an elongated curved tube 61 having a small pool of mercury 62 normally located at the lowest or rearmost part of the tube, and a pair of electrodes or contacts 61a in its forward end, which is the highest part of the tube. The tube 61 has an internal diameter small as compared to its length so that the mercury 62 takes a substantial time to move from the rear of the tube to the forward end. The inertia operated control 60 alone controls the energization of electromagnet 55 and thereby the condition of the outlet valve 53.

A correction limiting control is illustrated generally at 63 and comprises an electrical contact 64 attached to the body 1 and a contact 65, which is fixed on a bracket 66 attached to the axle 44. The two contacts are normally spaced apart but may be moved into engagement by a downward movement of the front end of the body 1 with respect to the axle 3. Such a downward movement might be occasioned by deceleration of the vehicle as it moves to the right as shown in the drawing, or by uneven loading of the vehicle. One of the contacts 64, 65 may be made adjustable by any suitable conventional means (not shown) to compensate for changes in loading of the vehicle.

*Operation of Fig. 4*

When the vehicle is decelerated so that the mercury 62 closes the contacts 61a at the right end of tube 61, the electromagnet 55 is energized through a circuit which may be traced from the positive terminal of battery 21 through a wire 69, contacts 61a, a wire 70, electromagnet 55 and a wire 71 to the opposite terminal of battery 21. This closes the valve 53, thereby preventing the escape of air from the inside of bellows 46 and stiffening the action of that bellows against forces tending to compress it. Under many conditions of pitching or deceleration of the vehicle, this actuation of the valve 53 is enough to prevent any substantial pitching motion of the body, and there is no further operation of the apparatus until termination of the deceleration which caused the initial closure of the circuit through contacts 61a.

If the deceleration continues and is sufficiently great, the right end of the body 1 will start to move downwardly toward the axle 45, bringing the two contacts 64 and 65 into engagement. This completes a circuit for the electromagnet 59 of the inlet valve 57. This circuit may be traced from the positive terminal of battery 21 through wire 69, contacts 61a, a wire 72, contacts 65, 64, wire 73, electromagnet 59 and wire 71 to the opposite terminal of battery 21. This energizes the electromagnet 59, opening valve 57 so that air is supplied to the interior of bellows 46 from the source of compressed air 8. This air under pressure continues to be supplied until the bellows 46 has expanded enough to separate the contacts 64 and 65. This action corrects any pitching motion which may have been caused by deceleration of the vehicle. If thereafter the deceleration terminates, the outlet valve 53 is opened by breaking of contacts 61a which also closes valve 57 and the pressure within the bellows 46 is relieved to its normal value.

The inertia operated control device 60 should respond primarily to acceleration or deceleration of the vehicle rather than to gravity. In other words, it is intended that this device respond to an acceleration or deceleration force which might cause a pitching motion of the vehicle rather than responding to gravity which would indicate that the body of the vehicle had already begun a pitching motion.

In this connection, when the word "acceleration" is used in this specification and claims, it is used in its generic sense as inclusive of negative acceleration or deceleration, unless a more limited meaning is apparent from the context.

The correction limiting control 63 is illustrated in a somewhat diagrammatic fashion. It may be desirable in some cases to replace the simple control illustrated with a device having a differential between the body-and-axle spacing at which the contacts are closed and the spacing at which the contacts are opened. In any event, there should be a substantial range of normal body-to-axle spacing within which the contacts do not close.

When the vehicle is travelling down hill to the right, the inertia control 60 may close its right-hand contacts 67, which causes closure of the valve 53 and thereby effectively stiffens the front spring supports, as explained above. No additional air is supplied to the bellows 46, however, until there is an actual deceleration sufficient to pitch the body 1 enough to close the contacts 64, 65.

When the vehicle is lightly loaded, it is unnecessary for the control mechanism to operate, particularly with respect to the supply of air from the source 8 to the bellows 46. However, under such circumstances, the contacts 64 and 65 will have moved apart to a distance greater than their spacing under normal load, so that air will be supplied to the bellows only under conditions of extreme acceleration or deceleration.

*Fig. 5*

This figure illustrates diagrammatically a combination of the sway control system of Fig. 1 and the pitch control system of Fig. 4 on a single vehicle. Those elements in Fig. 5 which are the same in structure and function as their counterparts in either Fig. 1 or Fig. 4 have been given the same reference numerals and will not be further described.

This figure shows a vehicle having a body 73, front wheels 74, mounted on a front axle 75 and two pairs of rear wheels 76 and 77, respectively, mounted on axles 78 and 79. The housings of the two axles 78 and 79 are connected by longitudinal frame members 80 which support two sway correcting bellows 4. Lateral brackets 81 are mounted on the frame member 80 for supporting the correction limiting controls 30. The control system for the bellows 4 is the same as that in the Fig. 1 and is, therefore, not repeated in Fig. 5.

The front axle 75 is provided with a forward extension 82 which supports a correction limiting control 63. The correction limiting bellows 46 is supported directly on the housing of axle 75. The apparatus for controlling the supply of compressed air to the bellows 46 is the same as in Fig. 4 and is not repeated in this figure.

It should be understood that the mechanism illustrated in Fig. 5 is in addition to the conventional spring system for the vehicle.

It should be noted that the arrangement illustrated in Fig. 5 provides an auxiliary three-point suspension system for the body 73. The lateral sway of the body is corrected by the two bellows 4 and their associated control system. Pitching of the body during deceleration is corrected by the bellows 46 and its associated control system. This arrangement, wherein only one pitch preventing bellows 46 is used, is particularly useful on highway vehicles which are commonly operated only in one direction. That is to say, if they are operated in reverse they are operated so slowly that pitching of the vehicle is not a problem.

*Fig. 6*

This figure illustrates a modified form of control system for use in a double-ended vehicle, i.e., one which may operate in either direction. Again, those elements which are the same in structure and function as their counterparts in the previous figures have been given the same reference numerals and will not be described in detail. The apparatus in Fig. 6 is a pitch control system only, no sway control mechanism being employed. It is substantially the same as the system shown in Fig. 4, except that it is duplicated for the two ends of the vehicle, including the front axle 83 and the rear axle 84. The control 60 is made double-ended, rather than single-ended as in Fig. 4. The body of the vehicle is generally indicated at 85 and is mounted on the conventional spring suspension as well as on the bellows 46.

*Fig. 7*

This figure illustrates a railway vehicle on which a pitch control system of the type shown in Fig. 6 is mounted. This figure includes a body 86 mounted on two trucks 87. Each truck 87 includes four wheels 88 mounted on two axles 89. The wheels of the axles are connected by a longitudinal frame member 90. The bellows 46 are mounted on that frame member. The system is otherwise the same as that shown in Fig. 6.

*Fig. 8*

This figure illustrates the invention as applied to a still different type of vehicle, which may be a large off-the-road vehicle, such as an earth mover. This vehicle includes a body 91 mounted on two spaced axles 92, located adjacent opposite ends. The housings of the two axles 92 are connected by longitudinal unsprung frame members 93. The axles 92 are provided with extensions 94 for supporting correction limiting controls 63.

There is provided a pitch control system similar to that in Figs. 6 and 7, including two bellows 46 which are mounted between the axles 92 and the vehicle body.

There is also provided a sway control system including two bellows 4 mounted between the two frame members 93 and the vehicle body. The sway control system includes correction limiting controls 30 mounted on brackets 95 which extend laterally from the frame members 93.

For optimum results, the bellows 46 should be exactly centered with respect to the frame members 93 or with respect to the vehicle body 91 and may be disposed at any selected position along the longitudinal center axis of either the frame or the body. They should also be equally spaced from the central transverse axis of the vehicle. These same principles apply to the location of the bellows 4, which should be equi-distantly spaced with respect to the longitudinal central axis and disposed along the central lateral axis of either the frame or body as aforesaid. It is noted, however, that if the bellows 46 are uniformly disposed with respect to the central axis of the frame, the bellows 4 must be similarly uniformly disposed with respect to the axis of the frame. If, however, the disposition of either set of bellows is with respect to the axis of the vehicle body, then both bellows 46 and 4 should be uniformly disposed with respect to that body. Normally, however, the central axes of the body and the frame will be coincident, although this might not always be the case.

While I have shown and described certain preferred embodiments of my invention, other modifications thereof will readily occur to those skilled in the art, and I, therefore, intend my invention to be limited only by the appended claims.

I claim:

1. Tilting control apparatus for a vehicle having a body and two rolling supports spaced longitudinally, each support comprising two laterally spaced wheels, axles for the wheels, and unsprung frame means mounted on the axles, sway control apparatus comprising means at each lateral side of the vehicle for applying a correcting force tending to move the body upwardly with respect to the frame means, pitch control apparatus comprising means at least at one end of the vehicle for applying a correcting force tending to move the body upwardly with respect to the unsprung frame means, each correcting force applying means comprising means defining an expansible chamber having relatively movable walls respectively connected to the axle and the body, a source of compressible fluid under pressure, and means for controlling the fluid pressure in said chambers including inlet valve means for the respective chambers, outlet valve means for the respective chambers, sway control means comprising inertia operated means for actuating the valve means connected to the chambers of said sway control apparatus in response to lateral acceleration or tilting of the vehicle body, pitch control means comprising inertia operated means for actuating the valve means connected to the chamber of said pitch control apparatus in response to longitudinal acceleration or tilting of the vehicle body, and correction inhibiting means for each of said correcting force applying means and effective to stabilize the force thereof when a portion of the body adjacent the force applying means is within a predetermined normal range of spacing from the unsprung frame means.

2. Tilting control apparatus as defined in claim 1, in which the vehicle normally runs in one direction, the respective force applying means of the sway control apparatus are located at the respective sides of the normally rearward rolling support, and the pitch control apparatus comprises only one force applying means located at the normally forward rolling support.

3. Tilting control apparatus as defined in claim 1, in which the vehicle may run in either direction, said unsprung frame means comprises longitudinal frame members extending between said spaced supports and adjacent to the sides of the vehicle, the respective force applying means of the sway control apparatus are located between the central portions of said longitudinal frame members and the body, and the pitch control apparatus comprises two force applying means located respectively at the centers of the two rolling supports.

4. Tilting control apparatus as defined in claim 1, in which said means at each lateral side of the vehicle constituting a part of said sway control apparatus are disposed on a transverse axis which is midway between the front and rear ends of the vehicle and are symmetrically disposed with respect to the central longitudinal axis of the vehicle; in which said pitch control apparatus comprises similar means adjacent to each end of the vehicle for applying a force tending to move the body upwardly as aforesaid; and in which said means adjacent to each end of the vehicle constituting a part of said pitch control apparatus are disposed along a longitudinal center line of the vehicle and are symmetrically disposed with respect to said transverse axis.

5. Tilting control apparatus for a vehicle having two wheels longitudinally spaced along the direction of movement of the vehicle, a body, and axles on which respectively said wheels are mounted, said control apparatus comprising means supported in the vehicle and respectively associated with said wheels and operatively connected to the respective axles and to said body and operable for applying a force to move the body in a predetermined direction with respect to the respective axles, means respectively connected to and for controlling operation of said force applying means, inertia operated means supported in the vehicle and movable from a normal position to an active position in response to longitudinal acceleration thereof in a given direction and in response to tilting of the body in a vertical plane extending longitudinally of the vehicle, said inertia operated means in said active position being operatively connected to said control means for actuating the respective control means to control the respective force applying means to move said body in said predetermined direction with respect to the respective axles concomitantly with tilting movement of the body in the direction opposite to said predetermined direction with respect to the respective axles, and a pair of correction modifying means respectively movable from respective normal positions to respective active positions in response to movement of the portions of said body adjacent the respective axles with respect to said axles in said predetermined direction from a normal spacing to a predetermined spacing, said correction modifying means respectively being operatively connected to said force applying means and being connected to said inertia operated means and effective when said inertia operated means and the respective correction modifying means both are in said active positions thereof for determining and maintaining a force applied by the respective force applying means to determine said spacing of said body with respect to the respective axles.

6. Tilting control apparatus for a vehicle adapted to run normally in the forward direction and having a front wheel and a rear wheel longitudinally spaced along said direction, a body, and an axle on which said front wheel is mounted, said control apparatus comprising means supported in said vehicle and operatively connected to said axle and to said body and operable for applying a force to move said body in a predetermined direction with respect to the axle, means for controlling operation of said force applying means, inertia operated means supported in said vehicle and movable in response to longitudinal acceleration thereof from a normal position to an active position, said inertia operated means in said active position being operatively connected to said control means for actuating said control means to control said force applying means to move said body in said predetermined direction with respect to the axle, and correction modifying means movable from a normal position to an active position in response to movement of said body with respect to said axle from a normal spacing to a predetermined spacing, said correction modifying means being operatively connected to said force applying means and to said inertia operated means and effective when said inertia operated means and said correction modifying means both are in said active positions thereof for determining and maintaining a force applied by said force applying means to determine the spacing of said body with respect to said axle.

7. Tilting control apparatus for a vehicle adapted to run normally in the forward direction and having a front wheel and a rear wheel longitudinally spaced along said direction, a body, and an axle on which said front wheel is mounted, said control apparatus comprising means supported in said vehicle and operatively connected to said axle and to said body and operable for applying a correcting force to move the body upwardly with respect to the axle, means for controlling operation of said force applying means, inertia operated means supported in said vehicle and movable in response to longitudinal acceleration thereof from a normal position to an active position, said inertia operated means in said active position being operatively connected to said control means for actuating said control means to control said force applying means to move said body upwardly with respect to the axle, and correction modifying means movable from a normal position to an active position in response to movement of said body with respect to said axle from a normal spacing to a predetermined spacing, said correction modifying means being operatively connected to said force applying means and to said inertia operated means and effective in said active position of said correction modifying means to control said force applying means to increase said force moving said body upwardly with respect to the axle, said correction modifying means in said normal position being effective to control said force applying means to inhibit said increase in said force when said body is in a position with respect to said axle within a predetermined range of spacing of said body from said axle.

References Cited in the file of this patent

UNITED STATES PATENTS

| | | |
|---|---|---|
| 2,115,159 | Dupuy | Apr. 26, 1938 |
| 2,124,124 | Schoepf | July 19, 1938 |
| 2,128,273 | Stevens | Aug. 30, 1938 |
| 2,133,773 | Rossman | Oct. 18, 1938 |
| 2,593,040 | Lloyd | Apr. 15, 1952 |
| 2,607,611 | Allison | Aug. 19, 1952 |
| 2,684,254 | Goss | July 20, 1954 |